United States Patent [19]
Tepe et al.

[11] 4,293,027
[45] Oct. 6, 1981

[54] CONTROL SYSTEM FOR HEATING AND COOLING UNITS

[75] Inventors: James R. Tepe, Montgomery; Robert P. Sandor, Fairfield, both of Ohio; Bernard W. Wesselman, Independence, Ky.; David R. Woeste, Williamsburg, Ohio

[73] Assignee: Energetics Systems Corp., Cincinnati, Ohio

[21] Appl. No.: 845,459

[22] Filed: Oct. 25, 1977

[51] Int. Cl.³ .............................................. F25B 29/00
[52] U.S. Cl. ........................................ 165/12; 165/16; 165/28; 236/1 E; 62/176 E
[58] Field of Search ....................... 165/16, 12, 27, 28; 236/49, 1 E; 62/176 E, 409

[56] References Cited
U.S. PATENT DOCUMENTS

| | | | |
|---|---|---|---|
| 2,209,787 | 7/1940 | Miller | 165/16 X |
| 2,327,536 | 8/1943 | Locke | 236/49 X |
| 2,336,242 | 12/1943 | Hanson | 62/176 E X |
| 2,407,036 | 9/1946 | Snavely | 165/16 |
| 3,927,713 | 12/1975 | Gilles | 165/16 |
| 3,982,583 | 9/1976 | Shavit | 165/16 |
| 4,044,823 | 8/1977 | Biesecker | 165/16 |
| 4,044,947 | 8/1977 | Spethmann | 165/16 X |

Primary Examiner—Albert W. Davis
Assistant Examiner—Margaret A. Focarino
Attorney, Agent, or Firm—Roy Schaeperklaus; James Pearce

[57] ABSTRACT

A control system for space heating and cooling units which includes modulated damper means for controlling entry of outside air. Temperature sensitive resistances sense the outside air temperature, the temperature in the space, and the temperature of return air. When cooling is required, the damper can be opened. When the return air temperature is greater than the outside air temperature, the outside air damper is modulated in opening direction when the space temperature rises above a minimum comfortable space air temperature so that the outside air is used for cooling. When the space temperature falls to a temperature below the minimum comfortable space air temperature, the outside air damper can be fully closed. When the space air temperature rises above the minimum comfortable space air temperature, the outside air damper can be opened a selected amount and then, as the space temperature rises further, the outside air damper can modulate open if the outside air temperature is below the return air temperature.

37 Claims, 6 Drawing Figures

CONTROL SYSTEM FOR HEATING AND COOLING UNITS

This invention relates to a heating and cooling system for an enclosed space. More particularly, this invention relates to a control system for actuating heating and cooling devices and for operating dampers thereof.

An object of this invention is to provide such a control system in which dampers are actuated to minimize the use of mechanical cooling while maintaining a comfortable temperature in the space.

A further object of this invention is to provide such a system in which outside air is introduced to cool the space when the temperature of outside air is lower than the temperature of return air from the space.

A further object of this invention is to provide such a system in which the introduction of outside air is minimized when mechanical cooling is required and the temperature of the outside air is higher than the temperature of the return air from the space.

A further object of this invention is to provide such a system in which introduction of outside air can be eliminated when the space is not in use.

Briefly, this invention provides a control system for heating and cooling units for an enclosed space which includes damper means for controlling entry of outside air. Temperature sensitive resistances sense the outside air temperature, the temperature in the space, and the temperature of return air. When cooling is required, the damper can be opened. When the return air temperature is some selected amount greater than the outside air temperature, the outside air damper is modulated in opening direction over a selected space temperature range when the space temperature rises above a preset space air temperature. If the outside air temperature is above a selected temperature, the modulation in opening direction can continue until another preset space temperature is reached, whereupon the outside air damper can be opened fully. If the outside air temperature is below the selected temperature, the modulation can continue during the additional mechanical cooling. When the space temperature falls to a temperature below the minimum comfortable space air temperature, the outside air damper can be fully closed, and additional heat can be added. When the space air temperature rises above the minimum comfortable space air temperature, the outside air damper can be opened a selected amount and then, as the space temperature rises further, the outside air damper modulates open if the outside air temperature is below the return air temperature or can remain at the minimum opening if the outside air temperature is not below the return air temperature.

The above and other objects and features of the invention will be apparent to those skilled in the art to which this invention pertains from the following detailed description and the drawings, in which.

In the following detailed description and the drawings, like reference characters indicate like parts.

Figure 1:
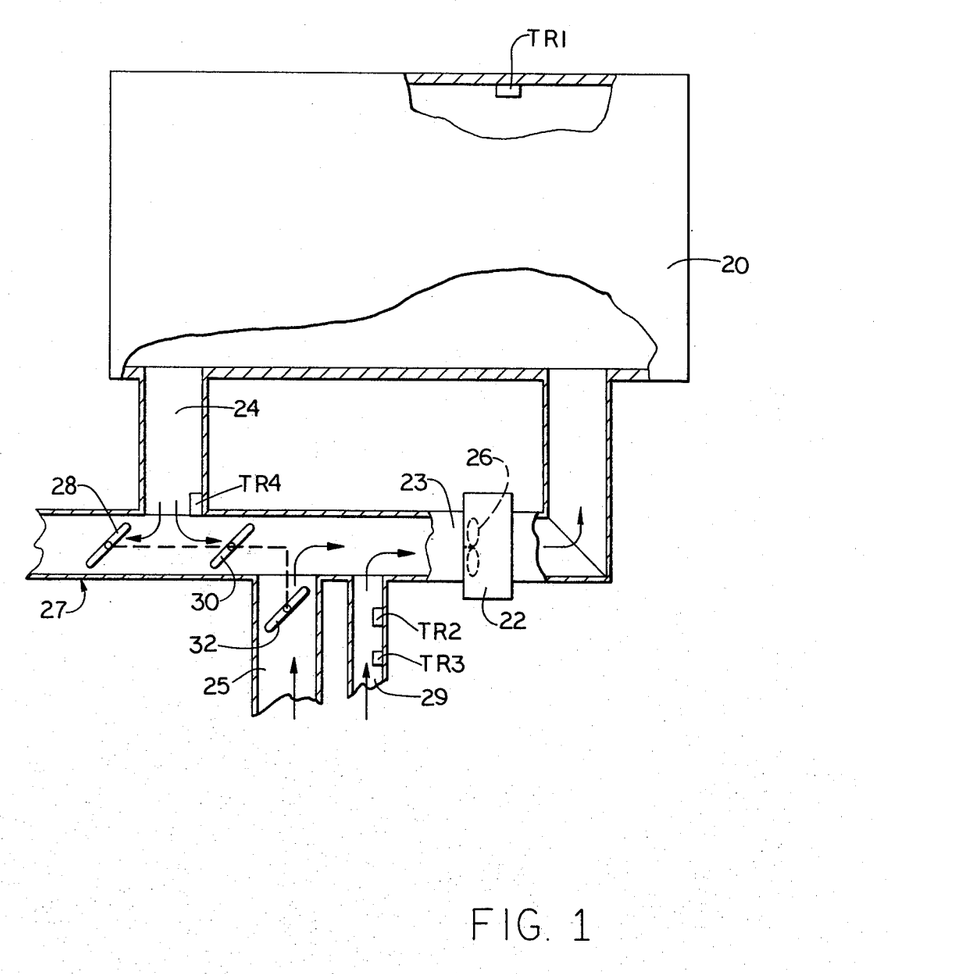
FIG. 1 is a somewhat schematic plan view, partly broken away and in section, of a building which includes a heating and cooling system having a control system constructed in accordance with an embodiment of this invention.

In FIG. 1 is shown schematically an enclosed space 20 provided with an appropriate unit 22 in which first and second heating elements or stages and first and second cooling elements or stages (not shown in detail) are mounted. The first heating stage is actuated when a first heating relay HR1 (FIG. 2) is energized, and the second heating stage is actuated when a second heating relay HR2 is energized. The first cooling stage is actuated when a first cooling relay CR1 is energized, and the second cooling stage is actuated when a second cooling relay CR2 is energized. Air can reach the unit 22 (FIG. 1) through a duct 23 which can receive air from a return air duct 24 and from an outside air inlet duct 25. The return air duct receives air from the space 20, and the outside air inlet duct 25 receives air from the space 20. A fan 26 directs the air from the duct 23 through the unit 22 to be discharged into the space 20. The fan is driven by an appropriate motor (not shown), which is actuated when a fan relay FR (FIG. 2) is energized. A vent duct 27 (FIG. 1) permits air to be discharged from the space 20.

A first temperature responsive resistance TR1 is mounted in the space 20 to sense the space temperature, second and third temperature responsive resistances TR2 and TR3 are mounted in an aspirator tube 29, which receives air from outside the space, to sense outside air temperature, and a fourth temperature responsive resistance TR4 is mounted in the return air duct 24 to sense temperature of the return air. The temperature responsive resistances TR1 and TR2 can sense dry bulb temperatures. The temperature responsive resistances TR3 and TR4 can also sense dry bulb temperatures. However, the temperature responsive resistances TR3 and TR4 can also be arranged to sense wet bulb temperatures. As will be explained more fully hereinafter, the temperature responsive resistances TR3 and TR4 are used to sense the difference between outside air temperature and return air temperature as an indication of heat content or enthalpy in determining proportions of outside air and return air to be circulated to the space. Since it has been determined that wet bulb temperature is a better indication of enthalpy than dry bulb temperature, the temperature responsive resistance TR3 and TR4 can sense wet bulb temperatures. However, if desired, the temperature responsive resistances TR3 and TR4 can sense dry bulb temperatures.

Dampers 28, 30 and 32 are mounted in the ducts 27, 24 and 25, respectively. The dampers 28, 30 and 32 are connected to turn together so that as the damper 30 closes, the dampers 28 and 32 open, and as the damper 30 opens, the dampers 28 and 32 close. An appropriate damper motor 34 (FIG. 2) (not shown in detail) actuates the dampers.

Figure 2:
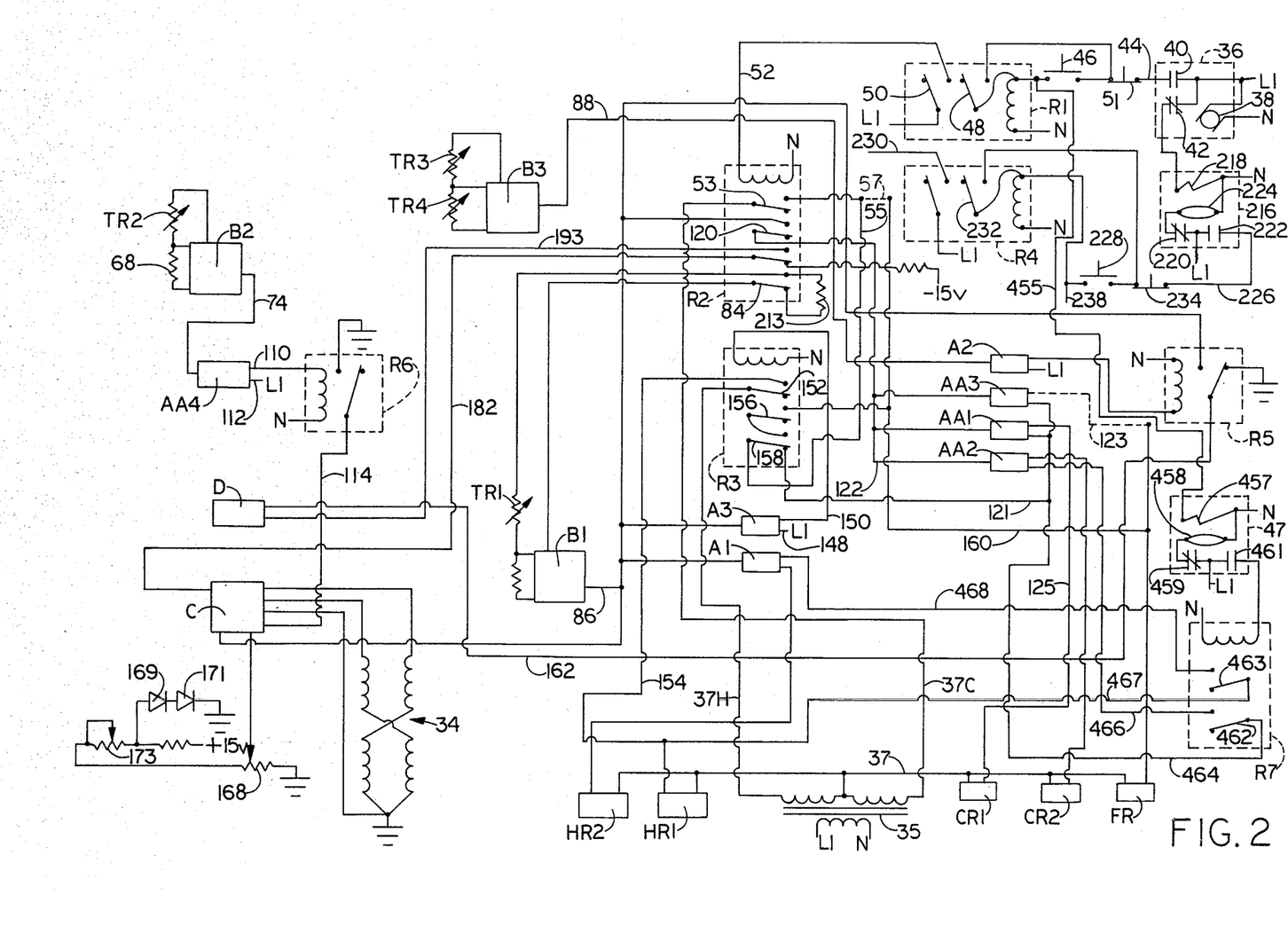
FIG. 2 is an overall schematic circuit diagram for the control system.

Reference is now made to FIG. 2, which is an overall schematic view of a control system for heating and cooling constructed in accordance with an embodiment of this invention together with a fragmentary portion of a second control system. In FIG. 2, connections to line leads are indicated at L1 and N. A transformer 35 supplies power for actuating the heating relays HR1 and HR2, the cooling relays CR1 and CR2 and the fan relay FR, the aforementioned relays being connected to a neutral lead 37 of secondary windings of the transformer 35. The secondary windings provide selected voltages between the neutral lead 37 and relay power leads 37C and 37H. A main time clock 36 is powered by an appropriate electric motor 38 and includes contacts 40 and 42. The contacts 40 and 42 are shown in their position when the space 20 is not in use, as at night, with contacts 40 open and contacts 42 closed. When the space 20 is about to be occupied, as at an early morning hour at a daily startup time, such as 7:00 A.M., the main time clock 36 can act to reverse the contacts so that, while the space 20 is occupied, the contacts 40 are closed to connect a lead 44 to the line lead L1, and the contacts 42 are open. When the space is again to be unoccupied, as at the end of a working day, the main time clock 36 returns the contacts 40 and 42 to the position shown.

When the lead 44 is connected to the line lead L1, a pushbutton switch 46 can be closed to energize a first relay R1 and a lead 455 to energize a time delay relay 47. A pole 48 of the relay R1 acts to form a hold-in circuit for the relay R1 and the time delay relay 47. A pole 50 of the relay R1 connects a lead 52 to the line lead L1 to actuate a relay R2. Actuation of the relays R1 and R2 sets the system in operation when the space 20 is occupied. The system can be deactivated by opening a normally closed pushbutton switch 51 to deenergize the relays R1 and R2 and the time delay relay 47. Energizing of the relay R2 positions an upper pole 53 thereof in its upper position at which the relay power lead 37C is connected to a lead 55. If one desires continuous operation of the fan 26 while the space is occupied and the relay R2 is energized, a jumper wire 57 is used to connect the lead 55 to a fan relay lead 160 to energize the fan relay FR. If intermittent fan operation is required only when heating or cooling is required, the jumper wire 57 is omitted.

When the time delay 47 is energized, a pilot member 457 is energized to permit energizing of a timer element 458. After a predetermined time, the timer element 458 causes contacts 459 to open and contacts 461 to close. When the contacts 461 close, a relay R7 is energized. Energizing of the relay R7 causes poles 462 and 463 thereof to move to their raised position at which the pole 462 connects a lead 464 to a lead 466 and the pole 463 connects a lead 467 to a lead 468. As will be pointed out in greater detail hereinafter, the second heating relay HR2 can be energized only when the leads 467 and 468 are connected, and the second cooling relay CR2 can only be energized when the leads 464 and 466 are connected. The timer 458 can be set to close the contacts 461 and open the contacts 459 after as long a delay as is reasonably convenient after the pushbutton switch 46 is closed so that the second heating relay HR2 and the second cooling relay CR2 are not energized during an initial period of restoring the space from night conditions. The time delay of the timer element 458 is preferably at least 30 minutes and is longer if reasonably convenient so that the second heater relay HR2 and the second cooling relay CR2 can be energized only after an initial period in excess of 30 minutes during which only the first heating relay HR1 and the first cooling relay CR1 can be energized.

Figure 5:
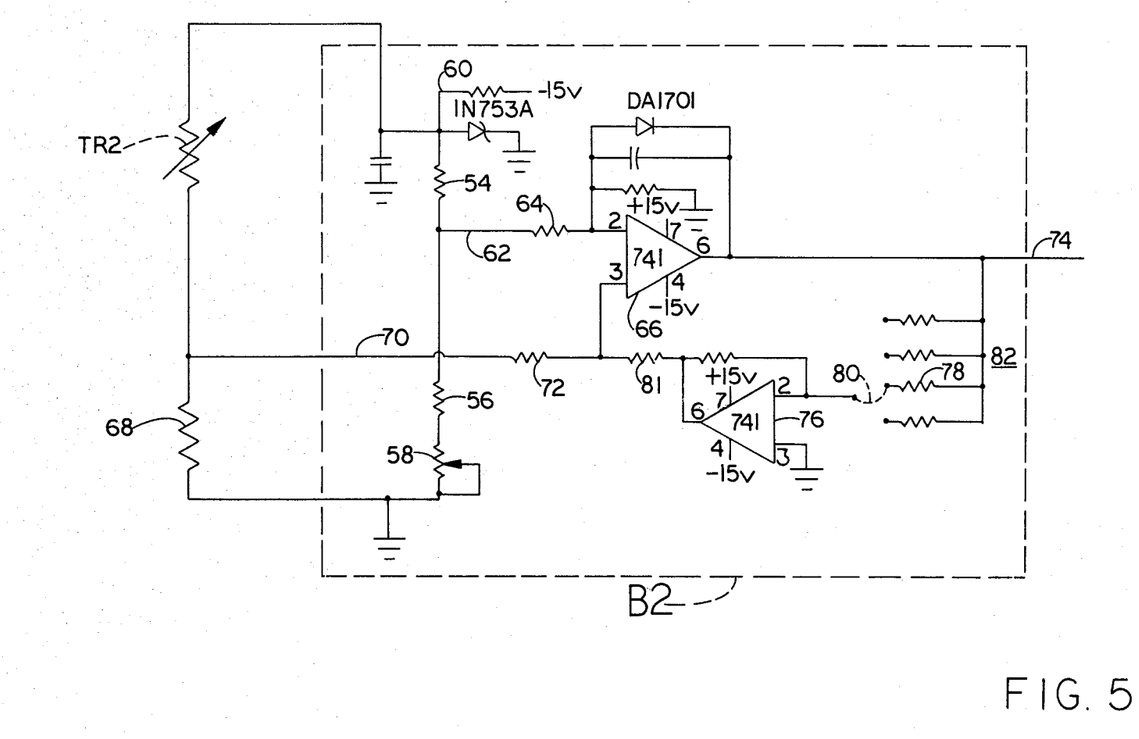
FIG. 5 is a schematic diagram of a temperature controlled circuit assembly of the circuit shown in FIG. 2, resistances which control the assembly being shown in association therewith.

The first temperature responsive resistance TR1 actuates a first temperature controlled circuit B1; the second temperature responsive resistance TR2 actuates a second temperature controlled circuit B2; and the temperature responsive resistances TR3 and TR4 actuate a third temperature controlled circuit B3. The temperature controlled circuits B1, B2 and B3 are similar in construction, and only the temperature controlled circuit B2 will be described in detail, as shown in FIG. 5. Voltage dividing resistances 54 and 56 and an adjustable resistance 58 are connected in series between a source of voltage 60 and ground. A lead 62 connects a junction between the voltage dividing resistors 54 and 56 through a resistance 64 to input pin 2 of an operational amplifier stage 66. The temperature responsive resistance TR2 and a control reference resistance 68 are connected in series between the same voltage source 60 and ground. A lead 70 connects a junction between the temperature responsive resistance TR2 and the control reference resistance 68 through a resistance 72 to input pin 3 of the amplifier stage 66. As the temperature of the outside air varies, the resistance of the temperature responsive resistance TR2 varies to cause the output voltage at pin 6 of the amplifier stage 66 and an output lead 74 to change by an amount controlled by the temperature of the outside air. The output lead 74 is connected to input pin 2 of a return amplifier stage 76 through a resistance 78 and a jumper wire 80. The output of the return amplifier stage 76 is connected through a resistance 81 to the input pin 3 of the amplifier stage 66, and the value of the resistance 78 determines the change in output voltage at the lead 74 for a given change in temperature at the temperature responsive resistance TR2. For a preferred embodiment of this invention, the resistance 78 can be 1.50 megaohms, and a change of temperature of 2 degrees Fahrenheit can cause a change in output of 1 volt. The resistance 78 can be one of a bank of resistances 82 connected to the output lead 74 and, if a different change in voltage for a given change in temperature is desired, the jumper wire 80 can be connected to a different one of the bank of resistances 82.

Thus, the voltage at the output lead 74 is a function of the temperature of the outside air as sensed by the temperature responsive resistance TR2. Similarly, when the relay R2 (FIG. 2) is energized to cause a pole 84 thereof to engage the upper contact engageable thereby, voltage at an output lead 86 of the temperature controlled circuit B1 is a function of the temperature of air in the space 20 as sensed by the temperature responsive resistance TR1. Furthermore, voltage at an output lead 88 of the temperature controlled circuit B3 is a function of the difference between the outside air temperature as sensed by the temperature responsive resistance TR3 and the return air temperature as sensed by the temperature responsive resistance TR4.

The output lead 74 from the temperature controlled circuit B2 is connected to a solid state relay circuit AA4 to actuate the relay circuit AA4. The relay circuit AA4 and relay circuits AA1, AA2 and AA3 are similar in construction, and only the relay circuit AA4 will be described in detail with reference to FIG. 4.

Figure 4:
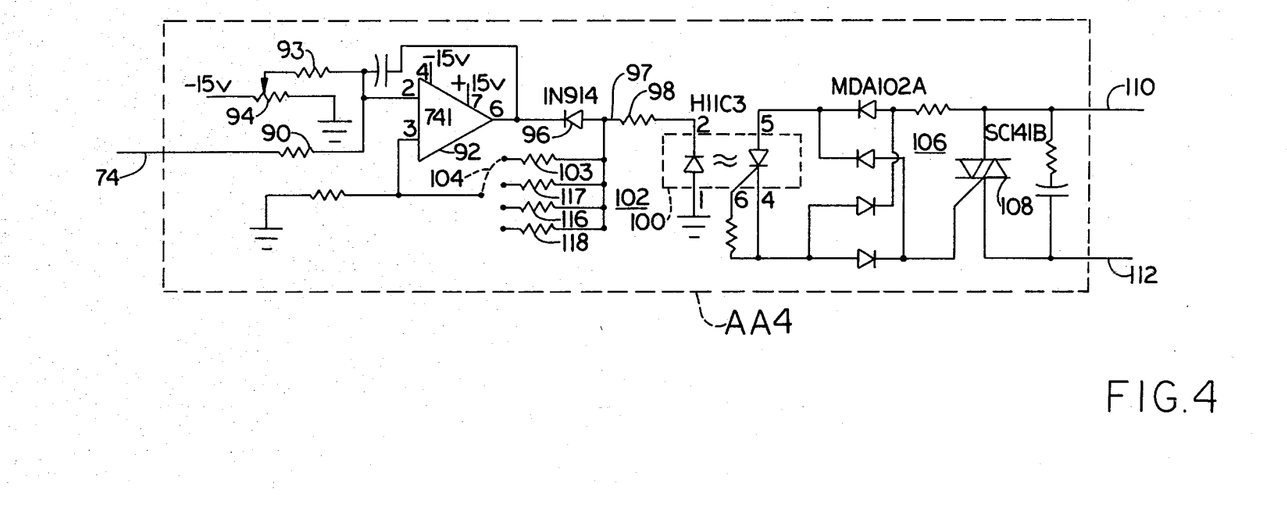
FIG. 4 is a schematic circuit diagram of a second voltage controlled relay element assembly of the circuit shown in FIG. 2.

The output lead 74 is connected through a resistance 90 to pin 2 of an amplifier stage 92. A tap of a potentiometer 94 is also connected through a resistance 93 to pin 2 of the amplifier stage 92, and the output at pin 6 of the stage 92 for a given voltage at the lead 74 can be adjusted by adjusting the potentiometer 94. The output from pin 6 is connected through a rectifier 96, a lead 97, and a resistance 98 to an optical coupling device 100. The lead 97 is connected to a bank of resistances 102. A selected resistance 103 of the bank of resistances 102 is connected by a jumper wire 104 to pin 3 of the amplifier stage 92. The value of the resistance 103 determines the differential between the voltage at the lead 74 at which the optical coupling device 100 starts to operate as the voltage at the lead 74 increases and the voltage at which the optical coupling device 100 ceases to operate as the voltage at the lead 74 decreases. The resistance 103 can be of a value which provides a 0.5 volt differential. The output of the optical coupler 100 is directed through rectifier net 106 to a solid state switching device 108. The solid state switching device 108 is caused to conduct when the voltage at the lead 74 rises above a selected voltage, which can be that at the lead 74 when the outside temperature is 60° F., and stops conducting when the outside air temperature falls below 59° F. and the value of the voltage at the lead 74 falls 0.5 volt below the voltage at which the solid state switching device 108 starts to conduct. When the solid state switching device 108 conducts, current can flow between leads 110 and 112. As shown in FIG. 2, when current flows between the leads 110 and 112, a relay R6 is actuated to connect a first damper controlling lead 114 to ground. The resistance 103 can be a 470 kiloohm resistance and can provide a 0.5 volt differential as already described. A resistance 116 can be a 120 kiloohm resistance and, when the jumper wire 104 is connected to the resistance 116 instead of to the resistance 103, a differential of 2.0 volts can be provided. A resistance 117 can be a 270 kiloohm resistance to provide a 1.0 volt differential. A resistance 118 can be a 68 kiloohm resistance to provide a 4 volt differential.

When the space is occupied and the relay R2 is energized, a pole 120 (FIG. 2) thereof engages the upper contact engageable thereby to connect the lead 86 to a lead 122, which controls the relay circuits AA1, AA2 and AA3. Since the lead 86 carries a voltage which is a function of the space temperature, the relay circuits AA1, AA2 and AA3 are controlled by the space temperature. The relay circuit AA1 can be set to be energized when the space temperature rises above a temperature such as 75.5° F. at which the first cooling unit is required and can energize the first cooling relay CR1 by providing a conducting path between leads 121 and 125. The lead 121 is connected to the lead 55 when a relay R3 is deenergized and, when the relay R2 is energized, through the pole 53 to the relay power lead 37C. When the space temperature falls more than 1° F. below that temperature, as to 74.5° F., the relay circuit AA1 can be deenergized. The relay circuit AA2 can be set to be energized when the space temperature rises above a temperature such as 76° F. at which both the first and second cooling units are required and can energize the second cooling relay CR2 when the relay R7 has been energized and the pole 462 thereof connects the leads 464 and 466. When the space temperature falls 1° F. below that temperature as to 75° F., the relay circuit AA2 can be deenergized. The relay circuit AA3 can be set to conduct when the space temperature rises to a temperature such as 74° F. at which the fan is required. If intermittent fan operation is required only during heating and cooling, a jumper wire 123 can connect the fan relay lead 160 to the relay circuit AA3 so that when cooling is required and the relay circuit AA3 conducts, the lead 121 is connected to the fan relay lead 160 to energize the fan relay FR. The relay circuit AA3 can stop conducting when the space temperature falls below 73° F. The jumper wire 123 can be omitted if continuous fan operation is desired and the jumper wire 57 is in place.

Figure 3:
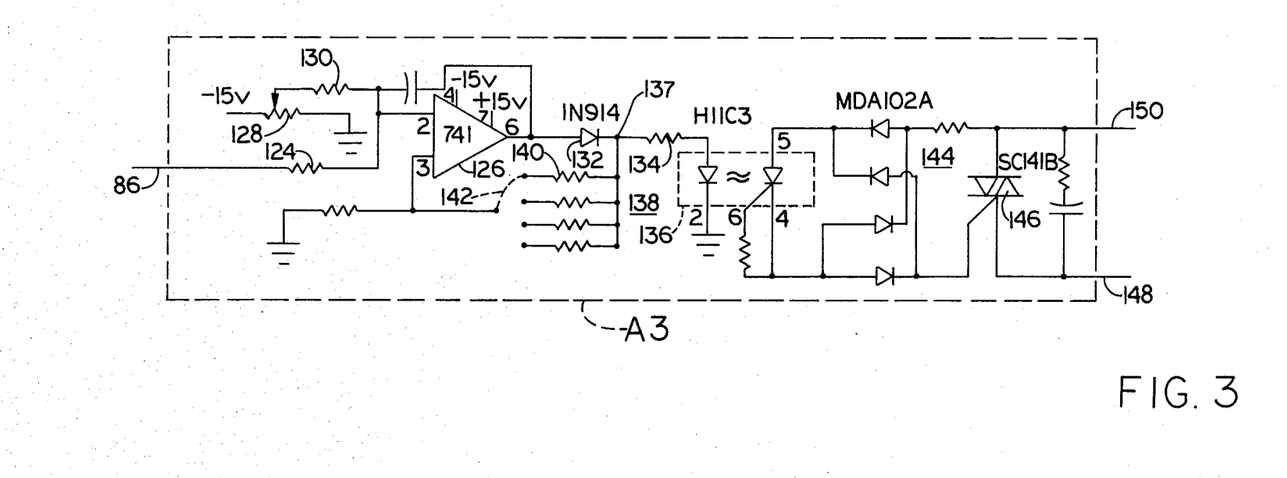
FIG. 3 is a schematic circuit diagram of a voltage controlled relay element assembly of the circuit shown in FIG. 2.

The output lead 86 for the space temperature controlled circuit B1 is connected to relay circuits A1 and A3. The relay circuits A1 and A3 and a relay circuit A2 are similar in construction, and only the relay circuit A3, shown in FIG. 3, will be described in detail. The output lead 86 carries a voltage which is a function of the space temperature. The output lead 86 is connected through a resistance 124 to pin 2 of an amplifier stage 126. A tap of a potentiometer 128 is also connected through a resistance 130 to pin 2 of the amplifier stage 126. The output at pin 6 of the amplifier stage 126 is connected through a rectifier 132 and a resistance 134 to an optical coupling device 136. A junction 137 between the rectifier 132 and the resistance 134 is connected to a bank of resistances 138. A selected resistance 140 of the bank of resistances 138 is connected by a jumper wire 142 to pin 3 of the amplifier stage 126. The resistances of the bank 138 can control the differential voltage between turn-on and turn-off in the manner outlined with reference to the relay circuit AA4. The output of the optical coupling device 136 is connected through a rectifier net 144 to a solid stage switching device 146. The potentiometer 128 is adjusted so that, when the temperature of the space falls below a selected temperature such as 71° F. at which the first heating element is required, the solid state switching device 146 conducts to permit current to flow between leads 148 and 150. As shown in FIG. 2, when current flows between the leads 148 and 150, the relay R3 is energized. Thus, the relay R3 is energized when heat is required.

When the relay R3 is energized, a pole 152 thereof engages its upper contact to connect the lead 37H to a lead 154 to energize the first heating relay HR1. Poles 156 and 158 also swing to their upper positions to connect the fan relay lead 160 to the lead 55 energizing the fan relay FR to cause operation of the fan 26 and disconnecting the lead 121 from the lead 55 so that the relay circuits AA1, AA2 and AA3 are ineffective when heat is required. If the temperature rises to a temperature of 72° F., the relay circuit A3 can cease to conduct. The relay circuit A1 can be set so that, if the space temperature falls to a temperature such as 70° F. at which both heating units are required, the relay circuit A1 conducts to energize the second heating relay HR2 when the relay R7 is energized and the pole 463 thereof connects the leads 467 and 468. The relay circuit A1 can also be set so that, when the space temperature rises above 71° F., the relay circuit A1 ceases to conduct, and the second heating relay HR2 is deenergized.

The relay circuit A2 is controlled by the temperature controlled circuit B3, which in turn is controlled by the temperature responsive resistances TR3 and TR4 so that the voltage of the output lead 88 is a function of the difference between the outside air temperature and the return air temperature, as has already been explained. The relay circuit A2 can be set so that it conducts when the outside temperature is lower than the return air temperature by a selected amount, as 3° F. When the relay circuit A2 conducts, a relay R5 is energized to connect a second damper controlling lead 162 to ground. Thus, the second damper controlling lead 162 is grounded when the outside air temperature falls 3° F. or more below the return air temperature. The relay circuit A2 can also be set so that it stops conducting when the outside air temperature is no more than 2° F. cooler than the return air temperature to deenergize the relay R5. When the relay R5 is deenergized, the lead 162 is connected to the space temperature controlled lead 86.

Figure 6:
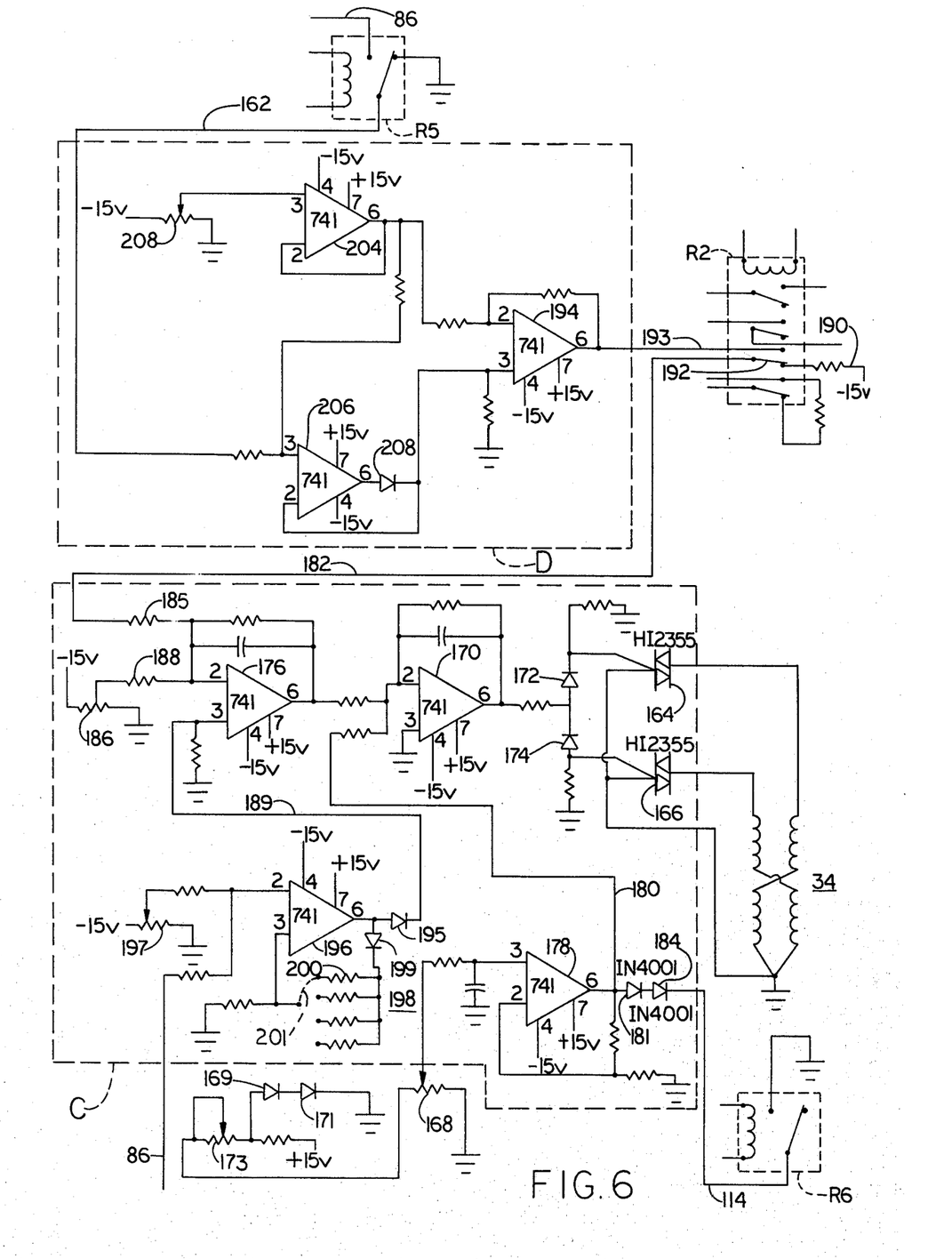
FIG. 6 is a schematic circuit diagram of damper motor control element assemblies of the circuit shown in FIG. 2, shading coils and a potentiometer circuit and portions of selected relays being shown in association therewith.

The damper motor 34 is controlled by a main damper control circuit C and an auxiliary damper control circuit D, both of which are shown in FIG. 6. Solid state switching devices 164 and 166 are connected to shading coils of the motor 34 so that, if the switching device 164 conducts, the damper motor 34 moves in a direction to open the outside air damper 32 and if the switching device 166 conducts, the damper motor 34 moves in a direction to close the outside air damper 32. A potentiometer 168 is connected to the damper motor 34 and moves therewith in a direction to increase the voltage on the tap thereof when the outside air damper 32 opens and to decrease the voltage thereon when the outside air damper 32 closes. A pair of diodes 169 and 171 and an adjustable resistance 173 control the voltage across the coil of the potentiometer 168.

The solid state switching devices 164 and 166 are controlled by an amplifier stage 170 and rectifiers 172 and 174. When the output potential at pin 6 of the amplifier stage 170 is zero, neither of the switching devices 164 and 166 conducts. When this output potential is positive, the switching device 164 conducts, and when this output potential is negative, the switching device 166 conducts.

Input to the amplifier stage 170 is provided by amplifier stages 176 and 178. Input to the amplifier stage 178 is supplied by the tap of the potentiometer 168, and the position of the damper motor thus determines the output of the amplifier stage 178 at a lead 180. The first damper controlling lead 114 is connected to the lead 180 through rectifiers 181 and 184 and, as will be explained in greater detail hereinafter, when the relay R6 is energized (when the outside air temperature is above a minimum temperature such as 60° F.) to connect the first damper controlling lead 114 to ground, the potential at the lead 180 is limited to a value determined by the gating voltage of the assembly of rectifiers 181 and 184 which can be +1.2 volts.

Input to the amplifier stage 176 is supplied by a lead 182 connected to pin 2 of the amplifier stage 176 through a resistance 185, a potentiometer 186 having its tap connected to pin 2 of the amplifier stage 176 through a resistance 188, and a lead 189 connected to pin 3 of the amplifier stage 176. When the relay R2 is deenergized, as at night when the space is unoccupied, the lead 182 is connected to a source of negative voltage 190 through a pole 192 of the relay R2. A positive voltage is provided at output pin 6 of the amplifier stage 176 and negative voltage is provided at pin 6 of the amplifier stage 170 so that the switching device 166 conducts, and the damper motor 34 is advanced to the position at which the outside air damper 32 is fully closed. When the space is occupied and the relay R2 is energized, the lead 182 is connected through a lead 193 to the output of an amplifier stage 194.

Output pin 6 of an amplifier stage 196 is connected to the lead 189 through a rectifier 195. Input to pin 2 of the amplifier stage 196 is supplied by the lead 86, which, as already explained, carries a voltage which is determined by the space temperature, and by a tap of a potentiometer 197. The tap of the potentiometer 197 can be set to provide a positive output voltage at the lead 189 when the space temperature falls below the temperature at which heat is first required, such as 71° F., which causes a negative voltage at the output pin 6 of the amplifier stage 170 to cause the damper motor to close the outside air damper 32. A bank of resistances 198 is connected to output pin 6 of the amplifier stage 196 through a rectifier 199. A selected resistance 200 of the bank of resistances 198 is connected to pin 3 of the amplifier stage 196 by a jumper wire 201. The resistance 200 can be 470 kiloohms to provide a 0.5 volt differential between turn-on and turn-off so that, when the space temperature rises to 72° F., the amplifier stage 196 ceases to conduct and the outside air damper 32 can open to its minimum opening position, as will be explained hereinafter.

Input to the amplifier stage 194 is provided by amplifier stages 204 and 206. Input to the amplifier stage 206 is provided by the second damper controlling lead 162 and the amplifier stage 204. When the outside air temperature is warmer than the return air temperature or has not reached at least 3° F. colder than the return air, the relay R5 is deenergized, as has already been explained, and the second damper controlling lead 162 is connected to ground so that the amplifier stage 144 is controlled by the amplifier stage 204. Under such circumstances, the output of the amplifier stage 194 is determined by the amplifier stage 204. Input to the amplifier stage 204 is provided by a potentiometer 208, which can be set so that, when the space requires cooling, the outside air damper 32 is open at least a selected minimum amount, such as 10% of the possible opening thereof.

When the outside air is more than 3° F. cooler than the return air, the relay R5 is energized, as has already been explained, and the second damper controlling lead 162 is connected to the lead 86, which has a voltage determined by the space temperature, so that the output of the amplifier stage 206 through a rectifier 208 is modulated as a function of the space temperature, and the output of the amplifier stages 194 and 176 are similarly modulated as a function of space temperature. Thus, as the space temperature rises above an initial temperature, the damper motor moves in a direction to open the outside air damper 32 so that the outside air is used to effect cooling. The potentiometer 186 can be adjusted to set the temperature at which the damper motor starts to modulate in a direction to open the outside air damper 32. As the outside air damper 32 opens, the potentiometer 168 follows to restore balance at the input to the amplifier stage 170 when the outside air damper has opened an amount determined by the space air temperature. Once the relay R5 has been energized, it remains energized until the differential between outside air temperature and return air temperature falls to less than 2° F., whereupon the relay R5 is deenergized, and the outside air damper is opened only to the selected minimum amount even when cooling is called for.

The circuit can be adjusted so that, when the outside air has reached over 3° F. cooler than the return air and the space temperature rises to 72° F., the outside air damper 32 opens to the minimum opening. When the space temperature rises above 72.6° F., the outside air damper starts to open further so that it is 16⅔% open at a space temperature of 73° F., 33⅓% open at 74° F., and 40% open at 74.5° F. If the outside air temperature is below 60° F. so that the relay R6 is deenergized, the modulation continues until the outside air damper 32 is fully open at a selected temperature such as 78° F. As the space temperature falls, the outside air damper modulates to closed position.

When the outside air temperature is above 60° F. so that the relay R6 is energized, the first damper control lead 114 is connected to ground, and, when the outside air damper 32 has modulated in opening direction to a selected position, such as 50% open, the positive voltage in the lead 180 reaches a limiting voltage determined by the sum of the gating voltages of the rectifiers 182 and 184, which can be 1.2 volts. The voltage in the lead 180 is limited to that voltage so that, when the outside air damper reaches the selected position, the damper motor continues to open the outside air damper to fully open position without further modulation when the outside air temperature is over 60° F.

At night, when the relay R2 is deenergized, the pole 84 serves to connect a resistance 213 in series with the temperature responsive resistance TR1 so that at night the space temperature, as sensed by the temperature responsive resistance TR1 can fall to a night minimum temperature such as 50° F. before the temperature controlled circuit B1 causes the relay circuit A3 to conduct to cause energizing of the relay R3 and the first heating relay HR1.

In some situations, it can be desirable to start heating or cooling units of a first area, such as a kitchen, at an early hour such as 7:00 A.M., while an associated area, such as a dining room, does not require heating or cooling until a later time after a predetermined time lapse, which can be at least 30 minutes and is as much longer as is convenient for bringing the associated area to comfortable conditions by the time the associated area is in use. In such a situation, an auxiliary timing device 216 (FIG. 2) and an auxiliary relay R4 are employed to control a second system including heating and cooling stages and fan and damper controls of the associated area. A pilot member 218 of the auxiliary timing device 216 is connected to the contacts 42 of the timer 36, and, during the night when controls of the timing device 36 are in the position shown, contacts 220 and 222 of the auxiliary timing device 216 also are in the condition shown. When the contacts 42 of the timer 36 open at an early hour, the pilot member 218 is deenergized, and a timer element 224 starts. After a predetermined time, which can be equal to the required time lapse, the contacts 220 open and the contacts 222 close. Opening of the contacts 220 deenergizes the timer element 224. Closing of the contacts 222 connects a lead 226 to the power lead L1. Thereafter, when an operator closes a pushbutton switch 228, the relay R4 is energized to connect a lead 230 to the power lead L1. A hold-in circuit including a pole 232 of the relay R4 maintains the relay R4 in energized position until the contacts 42 of the timer 36 close to reenergize the pilot 218 and cause the contacts 222 to open or until a pushbutton switch 234 is opened. The lead 230 can be connected to circuits (not shown) which can be similar to the circuits connected to the lead 52 and can cooperate with heating and cooling elements and fan and damper controls similar to those already described but associated with the area that requires heating and cooling after the time lapse. A lead 238 is connected to the pole 232 and can be connected to circuits similar to those to which the lead 455 is connected.

OPERATION

During the night time, the outside air damper 32 and the vent damper 28 are closed, and the return air damper 30 is open. The resistance 213 is connected in series with the space temperature responsive temperature controlled relay TR1 so that the space temperature controlled circuit B1 operates to cause the relay circuit A3 to conduct and energize the relay R3 and cause heating only when the space temperature falls to or below a minimum safe temperature, such as 50° F. Energizing of the relay R3 causes energizing of the first heating relay HR1 and the fan relay FR. If the temperature falls further to 49° F., the second heating relay HR2 can also be energized.

When the early morning time is reached at which the space 20 may be occupied, the main time clock 36 acts to connect the lead 44 to the line lead L1 and to deenergize the pilot member 218. When a person enters the space 20, the person can actuate the pushbutton switch 46 to energize the relays R1 and R2 and the time delay relay 47. After a time delay, set by the timer element 224, when the associated space may be occupied, the timer element 224 acts to connect the lead 226 to the line lead L1. Then, when heating or cooling is required in the associated space, the pushbutton switch 228 can be actuated to energize the relay R4. After a time delay set by the timer element 458, the relay R7 is energized to permit energizing of the second heating relay HR2 and the second cooling relay CR2 only after an initial period of restoring the space from night condition to occupied condition.

If operation of the fan 26 is desired at all times while the space is occupied, the jumper wire 57 can be in place so that the relay power lead 37C is connected to the fan relay lead 160 to power the fan relay FR and cause operation of the fan as long as the space is occupied and the relay R2 is energized. For continuous fan operation, the jumper wire 123 can be omitted.

If intermittent fan operation is desired only when heating or cooling is required, the jumper wire 57 is omitted and the jumper wire 123 is in place. During intermittent operation, if the space temperature as sensed by the temperature responsive resistance TR1 is below the temperature at which heat is required, such as 71° F., the temperature controlled circuit B1 causes the relay circuit A3 to conduct to energize the relay R3, and connect the relay power lead 37C through the pole 53 of the relay R2, the lead 55, the pole 158 of the relay R3, and the pole 156 of the relay R3 to the fan relay lead 160 to power the fan relay FR. If the space temperature is above the temperature at which cooling is required, as 74° F., the relay circuit AA3 is caused to conduct to connect the relay power lead 37C through the pole 53, the lead 55, the pole 158, the lead 121, the relay circuit AA3 and the jumper wire 123 to the fan relay lead 160 to power the fan relay FR to cause operation of the fan 26.

If, at the time the relay R2 is energized, the space temperature is below 71° F. and heating is required, the potential on the lead 86 supplied by the space temperature controlled circuit B1 causes the relay circuit A3 to conduct energizing the relay R3 to connect the relay power lead 37H to the lead 154 so that the first heating relay HR1 is energized. If the space temperature is below 70° F., the relay circuit A1 also conducts, and the second heating relay HR2 can also be energized if the time delay of the timer element 458 has expired. When the space temperature rises above 71° F., the second heating relay HR2 is deenergized, and when the space temperature rises to 72° F., the first heating relay HR1 and the heating relay R3 are deenergized. As long as the space temperature is below 72° F., the lead 86 (FIG. 6) and the potentiometer 197 put a sufficient potential on pin 2 of the amplifier stage 196 that the output thereof at the lead 189 causes a positive output from the amplifier stage 176 to cause a negative output from the amplifier stage 170 and cause the solid state switching device 166 to conduct and cause the outside air damper to remain closed.

When the heating relay R3 is deenergized, the lead 121 is connected through the pole 158, the lead 55, and the pole 53 of the relay R2 to the relay power lead 37C so that the relay circuits AA1, AA2 and AA3 can function to energize relays connected thereto. If, at the time the relay R2 is energized, the space temperature is above 75.5° F., and operation of a cooling unit is required, the space temperature controlled relay circuit B1 places a potential on the lead 86 and on the lead 122 and the relay circuits AA1 and AA2, which causes the relay circuit AA1 to conduct connecting the lead 121 to the lead 125 to energize the first cooling relay CR1. If the space temperature is over 76° F., the relay circuit AA2 is also caused to conduct to energize the cooling relay CR2 if the time delay of the timer element 458 has expired. When the space temperature falls below 75° F., the second cooling relay CR2 is deenergized and when the space temperature falls below 74.5° F., the first cooling relay CR1 is deenergized.

When the space temperature rises to 72° F., the outside air damper opens to a minimum position determined by the potentiometer 208 (FIG. 6). If the outside air temperature as sensed by the temperature responsive resistance TR3 is warmer than the return air temperature as sensed by the temperature responsive resistance TR4, or if the outside air temperature has not fallen to at least 3° F. cooler than the return air temperature, the relay R5 is deenergized, and the outside air damper remains at the minimum opening, which can be 10% of the total opening thereof, even when the space temperature increases above 72° F. because the outside air cannot effectively be used to cool the space. As has already been pointed out, the temperature sensed by the temperature responsive resistance TR3 and TR4 can be dry bulb temperatures, but the temperatures sensed by the resistances TR3 and TR4 preferably are wet bulb temperatures.

When the outside air temperature falls to more than 3° F. below the return air temperature, the relay R5 is energized and the outside air damper can be modulated so that the outside air is used to cool the space. When the space temperature rises above 72° F., the outside air damper remains in its minimum position until the space temperature reaches 72.6° F. and then modulates open, the outside air damper being 16⅔% open at 73° F., 33⅓% open at 74° F. and reaches 50% open at 75° F. If the outside air temperature is above 60° F., the relay R6 is energized and, once the outside air damper is 50% open, it continues to open to fully open position because, as long as the outside air temperature is over 60° F. but is at least 3° F. less than the return air temperature, full use of outside air is advantageous before the first cooling unit is actuated at 75.5° F. If the outside air temperature is below 60° F., the relay R6 is deenergized, and the modulation continues with space temperature to 78° F. at which temperature the outside air damper is fully open even if the outside air temperature is below 60° F. As the space temperature falls, the outside air damper closes, and in intermittent operation, the fan continues to operate until the space temperature falls to 73° F. and the outside air damper is 16⅔% open, whereupon the relay circuit AA3 ceases to conduct and the fan is stopped.

As has already been explained, the leads 230 and 238 (FIG. 2) can be connected to circuits similar to those already described that cooperate with elements for heating and cooling the associated area, such as a dining room. The auxiliary timing device 216 is arranged so that, if there is a power failure, the relay R4 can be reenergized after restoration of power by closing the pushbutton switch 228 without waiting for the time lapse of the auxiliary timing device 216.

When the time is reached at which the space is to be unoccupied, the main time clock 36 resets the contacts 40 and 42 to the condition shown, and the relays R1 and R2 and the time delay relay 47 are deenergized so that the night condition is restored.

In discussion of this invention, various numerical values have been given for ease in understanding the preferred embodiment of the invention. However, the various numerical values are given for purposes of example and can be adjustable as has been indicated, and various other modifications can be made without departing from the spirit and scope of the appended claims.

What is claimed is:

1. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air temperature, means for sensing return air temperature, means for sensing space temperature, a comparing device connected to the outside air temperature sensing means and to the return air temperature sensing means for providing a first signal when the outside air temperature is at least a selected amount cooler than the return air temperature and means for modulating the damper means connected to the comparing device and to the space temperature sensing means so as to increase the flow of outside air and decrease the flow of return air as the space temperature rises above a minimum selected space temperature when said first signal is provided.

2. A combination as in claim 1 which includes means for advancing the damper means to direct a maximum amount of outside air to the cooling stage when the space temperature rises above a selected space temperature and the outside air temperature is above a minimum selected outside air temperature and means for actuating the cooling stage when the space temperature rises above a maximum selected space temperature.

3. A combination as in claim 1 in which the cooling system includes a heating stage and the control unit includes means for actuating the heating stage when the space temperature falls below the minimum selected space temperature.

4. A combination as in claim 3 which includes means for actuating the damper means to close off flow of outside air when the space temperature falls below the minimum selected space temperature and means for opening the outside air damper to at least a selected minimum opening when the space temperature is above the minimum selected space temperature.

5. A combination as in claim 2 which includes means for modulating the damper means over a selected space temperature range including a range section at which the cooling stage is actuated when the outside air temperature is below the minimum selected outside air temperature.

6. A combination as in claim 1 wherein the vent means is connected to the conduit for directing return air to the cooling stage downstream of the means for sensing return air temperature and upstream of the damper means in the return air conduit whereby there is return air flow at the means for sensing return air temperature regardless of the position of the damper means in the return air conduit.

7. In combination with a cooling system for an enclosed space which includes a cooling stage, a conduit for directing return air from the space to the cooling stage, conduit for directing outside air to the cooling stage, damper means in the conduits for controlling flow in the conduits, and vent means for the space, the combination including a plurality of cooling stages, a control unit which includes means for sensing outside air temperature, means for sensing return air temperature, means for sensing space temperature, a comparing device connected to the outside air temperature sensing means and to the return air temperature sensing means for providing a first signal when the outside air temperature is at least a selected amount cooler than the return air temperature and means for modulating the damper means connected to the comparing device and to the space temperature sensing means so as to increase the flow of outside air and decrease the flow of return air as the space temperature rises above a minimum selected space temperature when said first signal is provided, stages of cooling above one stage being delayed on startup for a predetermined period of time regardless of space temperature requirements.

8. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air temperature, means for sensing return air temperature, means for sensing space temperature, a plurality of heating stages, a comparing device connected to the outside air temperature sensing means and to the return air temperature sensing means for providing a first signal when the outside air temperature is at least a selected amount cooler than the return air temperature, and means for modulating the damper means connected to the comparing device and to the space temperature sensing means so as to increase the flow of outside air and decrease the flow of return air as the space temperature rises above a minimum selected space temperature when said first signal is provided stages of heating above one stage being delayed on startup for a predetermined period of time regardless space temperature requirements.

9. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air wet bulb temperature, means for sensing return air wet bulb temperature, means for sensing space dry bulb temperature, a comparing device connected to the outside air wet bulb temperature sensing means and to the return air wet bulb temperature sensing means for providing a first signal when the outside air wet bulb temperature is at least a selected amount cooler than the return air wet bulb temperature and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided.

10. A combination as in claim 9 which includes means for advancing the damper means to direct a maximum amount of outside air to the cooling stage when the space dry bulb temperature rises to a selected dry bulb space temperature and the outside air dry bulb temperature is above a minimum selected outside air dry bulb temperature and means for actuating the cooling stage when the space dry bulb temperature rises above a maximum selected space dry bulb temperature.

11. A combination as in claim 9 in which the cooling system includes a heating stage and the control unit includes means for actuating the heating stage when the space dry bulb temperature falls below the minimum selected space dry bulb temperature.

12. A combination as in claim 11 which includes means for actuating the damper means to close off flow of outside air when the space dry bulb temperature falls below the minimum selected space dry bulb temperature and means for opening the outside air damper to at least a selected minimum opening when the space dry bulb temperature is above the minimum selected space dry bulb temperature.

13. A combination as in claim 10 which includes means for modulating the damper means over a selected space dry bulb temperature range including a range section at which the cooling stage is actuated when the outside air dry bulb temperature is below the minimum selected outside air dry bulb temperature.

14. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of cooling stages, a control unit which includes means for sensing outside air wet bulb temperature, means for sensing return air wet bulb temperature, means for sensing space dry bulb temperature, a comparing device connected to the outside air wet bulb temperature sensing means and to the return air wet bulb temperature sensing means for providing a first signal when the outside air wet bulb temperature is at least a selected amount cooler than the return air wet bulb temperature, and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided, stages of cooling above one stage being delayed on startup for a predetermined period of time regardless of space temperature requirements.

15. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air wet bulb temperature, means for sensing return air wet bulb temperature, means for sensing space dry bulb temperature, a plurality of heating stages, a comparing device connected to the outside air wet bulb temperature sensing means and to the return air wet bulb temperature sensing means for providing a first signal when the outside air wet bulb temperature is at least a selected amount cooler than the return air wet bulb temperature for sensing when the outside air web bulb temperature is at least a selected amount lower than the return air wet bulb temperature, and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided, stages of heating above one stage being delayed on startup for a predetermined period of time regardless of space temperature requirements.

16. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air dry bulb temperature, means for sensing return air dry bulb temperature, means for sensing space dry bulb temperature, a comparing device connected to the outside air dry bulb temperature sensing means and to the return air dry bulb temperature sensing means for providing a first signal when the outside air dry bulb temperature is at least a selected amount cooler than the return air dry bulb temperature, and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided.

17. A combination as in claim 16 which includes means for advancing the damper means to direct a maximum amount of outside air to the cooling stage when the space dry bulb temperature rises above a selected dry bulb space temperature and the outside air dry bulb temperature is above a minimum selected outside air dry bulb temperature and means for actuating the cooling stage when the space dry bulb temperature rises above a maximum selected space dry bulb temperature.

18. A combination as in claim 16 in which the cooling system includes a heating stage and the control unit includes means for actuating the heating stage when the space dry bulb temperature falls below the minimum selected space dry bulb temperature.

19. A combination as in claim 18 which includes means for actuating the damper means to close off flow of outside air when the space dry bulb temperature falls below the minimum selected space dry bulb temperature and means for opening the outside air damper to at least a selected minimum opening when the space dry bulb temperature is above the minimum selected space dry bulb temperature.

20. A combination as in claim 18 which includes means for modulating the damper means over a selected space dry bulb temperature range including a range section at which the cooling stage is actuated when the outside air dry bulb temperature is below the minimum selected outside air dry bulb temperature.

21. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of cooling stages, a control unit which includes means for sensing outside air dry bulb temperature, means for sensing return air dry bulb temperature, means for sensing space dry bulb temperature, a comparing device connected to the outside air dry bulb temperature sensing means and to the return air dry bulb temperature sensing means for providing a first signal when the outside air dry bulb temperature is at least a selected amount cooler than the return air dry bulb temperature, and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided, stages of cooling above one stage being delayed on startup for a predetermined period of time regardless of space temperature requirements.

22. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air dry bulb temperature, means for sensing return air dry bulb temperature, means for sensing space dry bulb temperature, a plurality of heating stages, a comparing device connected to the outside air dry bulb temperature sensing means and to the return air dry bulb temperature sensing means for providing a first signal when the outside air dry bulb temperature is at least a selected amount cooler than the return air dry bulb temperature, and means for modulating the damper means connected to the comparing device and to the space dry bulb temperature sensing means so as to increase the flow of outside air and decrease the flow of return air as the space dry bulb temperature rises above a minimum selected space dry bulb temperature when said first signal is provided, stages of heating above one stage being delayed on startup for a predetermined period of time regardless of space temperature requirements.

23. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air temperature, return air temperature, and space temperature, a plurality of heating stages, and means for modulating the damper means to increase the flow of outside air and decrease the flow of return air as the space temperature rises above a minimum selected space temperature when the outside air temperature is at least a selected amount cooler than the return air temperature, stages of heating above one stage being delayed on startup for a period of time in excess of 30 minutes regardless of space temperature requirements.

24. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air wet bulb temperature, return air wet bulb temperature, and space dry bulb temperature, a plurality of heating stages, and means for modulating the damper means to increase the flow of outside air and decrease the flow of return air as the space dry bulb temperature rises above a minimum selected space dry bulb temperature when the outside air wet bulb temperature is at least a selected amount lower than the return air wet bulb temperature, stages of heating above one stage being delayed on startup for a period of time in excess of 30 minutes regardless of space temperature requirements.

25. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air dry bulb temperature, return air dry bulb temperature, and space dry bulb temperature, a plurality of heating stages, and means for modulating the damper means to increase the flow of outside air and decrease the flow of return air as the space dry bulb temperature rises above a minimum selected space dry bulb temperature when the outside air dry bulb temperature is at least a selected amount lower than the return air dry bulb temperature, stages of heating above one stage being delayed on startup for a period of time in excess of 30 minutes regardless of space temperature requirements.

26. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of cooling stages, a control unit which includes means for sensing outside air temperature, return air temperature, and space temperature, and means for modulating the damper means to increase the flow of outside air and decrease the flow of return air as the space temperature rises above a minimum selected space temperature when the outside air temperature is at least a selected amount cooler than the return air temperature, stages of cooling above one stage being delayed on startup for a period of time in excess of 30 minutes regardless of space temperature requirements.

27. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of cooling stages, a control unit which includes means for sensing outside air wet bulb temperature, return air wet bulb temperature, and space dry bulb temperature, and means for modulating the damper means to increase the flow of outside air and decrease the flow of return air as the space dry bulb temperature rises above a minimum selected space dry bulb temperature when the outside air wet bulb temperature is at least a selected amount lower than the return air web bulb temperature, stages of cooling above one stage being delayed on startup for a period of time in excess of 30 minutes regardless of space temperature requirements.

28. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of cooling stages, a control unit which includes means for sensing outside air dry bulb temperature, return air dry bulb temperature, and space dry bulb temperature, and means for modulating the damper means to increase the flow of outside air and decrease the flow of return air as the space dry bulb temperature rises above a minimum selected space dry bulb temperature when the outside air dry bulb temperature is at least a selected amount lower than the return air dry bulb temperature, stages of cooling above one stage being delayed on startup for a period of time in excess of 30 minutes regardless of space temperature requirements.

29. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of heating and cooling stages, a control unit which includes means for sensing outside air temperature, return air temperature, and space temperature, and means for modulating the damper means to increase the flow of outside air and decrease the flow of return air as the space temperature rises above a minimum selected space temperature when the outside air temperature is at least a selected amount cooler than the return air temperature, selected stages of heating and cooling being delayed in startup for a period of time in excess of 30 minutes regardless of space temperature requirements.

30. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of heating and cooling stages, a control unit which includes means for sensing outside air wet bulb temperature, return air wet bulb temperature, and space dry bulb temperature, and means for modulating the damper means to increase the flow of outside air and decrease the flow of return air as the space dry bulb temperature rises above a minimum selected space dry bulb temperature when the outside air wet bulb temperature is at least a selected amount lower than the return air wet bulb temperature, selected stages of heating and cooling being delayed on startup for a period of time in excess of 30 minutes regardless of space temperature requirements.

31. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, the combination including a plurality of heating and cooling stages, a control unit which includes means for sensing outside air dry bulb temperature, return air dry bulb temperature, and space dry bulb temperature, and means for modulating the damper means to increase the flow of outside air and decrease the flow of return air as the space dry bulb temperature rises above a minimum selected space dry bulb temperature when the outside air dry bulb temperature is at least a selected amount lower than the return air dry bulb temperature, selected stages of heating and cooling being delayed on startup for a period of time in excess of 30 minutes regardless of space temperature requirements.

32. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air temperature, return air temperature, and space temperature, the cooling system including a heating stage, the combination including a plurality of systems, and means for modulating the damper means to increase the flow of outside air and decrease the flow of return air as the space temperature rises above a minimum selected space temperature when the outside air temperature is at least a selected amount cooler than the return air temperature, systems in excess of one being delayed on startup for a period of time in excess of 30 minutes regardless of space temperature requirements.

33. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air wet bulb temperature, return air wet bulb temperature, and space dry bulb temperature, the cooling system including a heating stage, the combination including a plurality of systems, and means for modulating the damper means to increase the flow of outside air and decrease the flow of return air as the space dry bulb temperature rises above a minimum selected space dry bulb temperature when the outside air wet bulb temperature is at least a selected amount lower than the return air wet bulb temperature, systems in excess of one being delayed on startup for a period of time in excess of 30 minutes regardless of space temperature requirements.

34. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air dry bulb temperature, return air dry bulb temperature, and space dry bulb temperature, the cooling system including a heating stage, the combination including a plurality of systems, and means for modulating the damper means to increase the flow of outside air and decrease the flow of return air as the space dry bulb temperature rises above a minimum selected space dry bulb temperature when the outside air dry bulb temperature is at least a selected amount lower than the return air dry bulb temperature, systems in excess of one being delayed on startup for a period of time in excess of 30 minutes regardless of space temperature requirements.

35. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air temperature, return air temperature, and space temperature, the combination including a plurality of cooling systems, and means for modulating the damper means to increase the flow of outside air and decrease the flow of return air as the space temperature rises above a minimum selected space temperature when the outside air temperature is at least a selected amount cooler than the return air temperature, cooling systems in excess of one being delayed on daily startup for a period of time in excess of 30 minutes regardless of space temperature requirements.

36. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air wet bulb temperature, return air wet bulb temperature, and space dry bulb temperature, the combination including a plurality of cooling systems, and means for modulating the damper means to increase the flow of outside air and decrease the flow of return air as the space dry bulb temperature rises above a minimum selected space dry bulb temperature when the outside air wet bulb temperature is at least a selected amount lower than the return air wet bulb temperature, cooling systems in excess of one being delayed on daily startup for a period of time in excess of 30 minutes regardless of space temperature requirements.

37. In combination with a cooling system for an enclosed space which includes a cooling stage, a conduit for directing return air from the space to the cooling stage, a conduit for directing outside air to the cooling stage, damper means in the conduits for controlling flow in the conduits, and vent means for the space, a control unit which includes means for sensing outside air dry bulb temperature, return air dry bulb temperature, and space dry bulb temperature, the combination including a plurality of cooling systems, and means for modulating the damper means to increase the flow of outside air and decrease the flow of return air as the space dry bulb temperature rises above a minimum selected space dry bulb temperature when the outside air dry bulb temperature is at least a selected amount lower than the return air dry bulb temperature, cooling systems in excess of one being delayed on daily startup for a period of time in excess of 30 minutes regardless of space temperature requirements.

* * * * *